United States Patent
Radmand (10) Patent No.: US 11,684,097 B2
(45) Date of Patent: Jun. 27, 2023

(54) TOURMALINE AND PHYTOCHEMICAL MEDICAL FORMULATIONS AND MEDICAL DEVICES FORMED OF SAME

(71) Applicant: Achaemenid, LLC, Boston, MA (US)

(72) Inventor: Reza Radmand, Boston, MA (US)

(73) Assignee: Achaemenid, LLC, Boston, MA (US)

( * ) Notice: Subject to any disclaimer, the term of this patent is extended or adjusted under 35 U.S.C. 154(b) by 55 days.

(21) Appl. No.: 17/224,525

(22) Filed: Apr. 7, 2021

(65) Prior Publication Data

US 2021/0315298 A1 Oct. 14, 2021

Related U.S. Application Data

(60) Provisional application No. 63/054,258, filed on Jul. 21, 2020, provisional application No. 63/040,025, filed on Jun. 17, 2020, provisional application No. 63/006,825, filed on Apr. 8, 2020.

(51) Int. Cl.
| | |
|---|---|
| *A01N 25/34* | (2006.01) |
| *A01N 31/08* | (2006.01) |
| *A01N 59/14* | (2006.01) |
| *A01N 25/10* | (2006.01) |
| *A41D 13/11* | (2006.01) |

(52) U.S. Cl.
CPC .......... *A41D 13/1192* (2013.01); *A01N 25/10* (2013.01); *A01N 25/34* (2013.01); *A01N 31/08* (2013.01); *A01N 59/14* (2013.01)

(58) Field of Classification Search
None
See application file for complete search history.

(56) References Cited

FOREIGN PATENT DOCUMENTS

| CN | 106237719 A | * | 12/2016 | ............ B01D 39/14 |
| CN | 107029560 A | * | 8/2017 | .......... B01D 46/543 |
| JP | 2004188620 A | * | 7/2004 | |
| JP | 2010242733 A | * | 10/2010 | |
| KR | 2005010302 A | * | 1/2005 | |
| KR | 2011127293 A | * | 11/2011 | |

OTHER PUBLICATIONS

Celliant, How Celliant is Made, Jul. 14, 2019, 6 pgs., https://celliant.com/how-its-made/.
Gilling et al., Antiviral efficacy and mechanisms of action of oregano essential oil and its primary component carvacrol against murine norovirus, Journal of Applied Microbiology ISSN 1364-5072, Nov. 5, 2013, 15 pgs.
Hagbom et al., Ionizing air affects influenza virus infectivity and prevents airborne-transmission, Nov. 27, 2014, 10 pgs., www.nature.com/scientificreports.
Han et al., Chemical composition and antioxidant activities of essential oils from different parts of the oregano*#, Journal of Zhejiang University-Science B, 2017, 6 pgs.
Hu et al., The Preparation and Characterization of Tourmaline-Containing Functional Copolymer p (VST/MMA/BA), Journal of Spectroscopy, vol. 2018, Article ID 5031205, Dec. 14, 2017, 8 pgs.
Krepker et al., Antimicrobial Carvacrol-Containing Polypropylene Films: Composition, Structure and Function, Dec. 3, 2017, 18 pgs.

* cited by examiner

*Primary Examiner* — Alton N Pryor
(74) *Attorney, Agent, or Firm* — Womble Bond Dickinson (US) LLP (57) ABSTRACT

A personal protective equipment includes a substrate, and an anti-microbial substance is positioned in the substrate. The anti-microbial substance includes tourmaline. The personal protective equipment may include a face mask or a garment having a nonwoven body. The anti-microbial substance is positioned on or in the nonwoven body.

14 Claims, 12 Drawing Sheets

TOURMALINE AND PHYTOCHEMICAL MEDICAL FORMULATIONS AND MEDICAL DEVICES FORMED OF SAME

CROSS-REFERENCE TO RELATED APPLICATIONS

This application claims the benefit of U.S. Provisional Application No. 63/054,258 filed Jul. 21, 2020, U.S. Provisional Application No. 63/040,025 filed Jun. 17, 2020 and U.S. Provisional Application No. 63/006,825 filed Apr. 8, 2020, each of which is incorporated herein by reference in its entirety.

BACKGROUND

Scientists and medical personnel use various materials to treat wounds and prevent the transmission of bacteria. Such treatments and preventative measures aim to prevent bacteria and viruses from infecting persons who may not already be infected by a bacterial infection or virus.

Various topical agents, such as gels and ointments, are typically used to treat wounds, such as cuts, scrapes, and pressure sores, as well as lesions. Such topical agents aim to expedite or enhance the healing process, prevent infection and help to reduce the pain experienced by the injured. Current topical agents include iodine, honey, and any other antiseptic agents to treat wounds.

The air we breathe is typically polluted by various substances, such as dust, bacteria, and viruses. For example, the virus that causes the novel coronavirus (COVID-19) may be transmitted through droplets generated when an infected person coughs, sneezes, or speaks. Thus, various efforts to clean the air we breathe and prevent the transmission of disease have been undertaken. Such efforts include the use of filtration medium, such as home filters, powered filter units, and face masks. Face masks, such as surgical face masks, are worn by health care professionals to protect patients and the wearers of the masks. Such masks can often catch bacterial and viral particles shed from the wearer's mouth and nose. In addition, the masks are often readjusted by the wearer during use to provide for a comfortable fit for the wearer, which may transfer other bacterial and viral particles to the user's face and/or mucosal surfaces (ex: mouth, nose, eyes). Concerns have arisen as to the effectiveness of such face masks in protecting patients.

Accordingly, there is a need for a topical agent that can be used to treat surface wounds. There is a further need for a personal protective equipment including an agent to reduce the transfer of bacteria and virus across the surface of the personal protective equipment. There is an even further need for a face mask including an agent that not only reduces the transfer of bacteria and virus, but also inhibits the growth of bacteria and virus on the surface of a personal protective equipment.

There is a further need for an oral appliance that inhibits or limits the growth and transfer of bacteria and viruses from the user of the oral appliance to others.

BRIEF SUMMARY

Embodiments of the disclosure are associated with a personal protective equipment including a fibrous material. The fibrous material includes tourmaline.

Further embodiments of the disclosure are associate with a personal protective equipment including a face mask. According to an aspect, the face mask includes a nonwoven body, and a polymer including tourmaline powder. The polymer may be adhered or otherwise secured to the nonwoven body.

Additional embodiments of the disclosure are associated with a personal protective equipment including a garment. The garment includes a nonwoven body and a polymer including tourmaline powder. The polymer may be adhered or otherwise secured to the nonwoven body.

BRIEF DESCRIPTION OF THE SEVERAL VIEWS OF THE DRAWINGS

A more particular description will be rendered by reference to exemplary embodiments that are illustrated in the accompanying figures. Understanding that these drawings depict exemplary embodiments and do not limit the scope of this disclosure, the exemplary embodiments will be described and explained with additional specificity and detail through the use of the accompanying drawings in which.

DETAILED DESCRIPTION

Reference will now be made in detail to various embodiments. Each example is provided by way of explanation and is not meant as a limitation and does not constitute a definition of all possible embodiments.

Embodiments described herein relate generally to a topical agent for use on surface wounds. The topical agent includes tourmaline powder. As would be understood by one of ordinary skill in the art, tourmaline powder is a negative ion powder. It has been found that negative ions may be able to promote increased metabolism of the human body, prevent influenza, and enhance the immune system.

The tourmaline may be provided in a variety of grain size ranges. According to an aspect, the tourmaline powder is provided in a grain size range of about 40 microns to about 50 microns.

Figure 1:
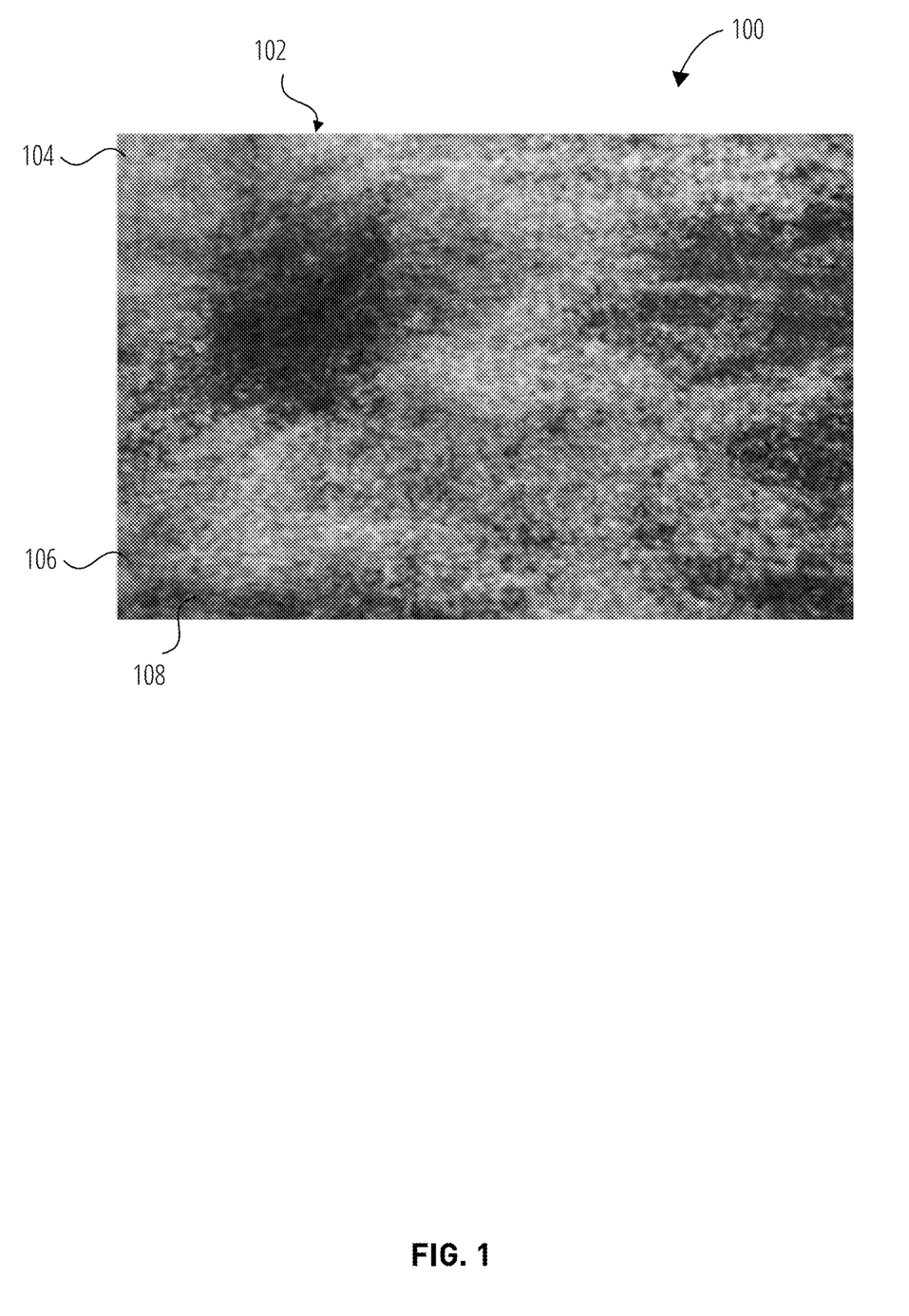
FIG. 1 fibrous material, in accordance with an embodiment.

FIG. 1 illustrates a portion of an exemplary personal protective equipment 100. The personal protective equipment 100 may be wearable. As understood by one of ordinary skill in the art, personal protective equipment 100 typically includes face masks, protective gowns, gloves, and the like.

The personal protective equipment 100 may include a substrate, including but not limited to a fibrous material 102, and an anti-microbial substance. The anti-microbial substance may be integrated into the substrate or applied topically to the substrate. The anti-microbial substance may include tourmaline powder 104. The fibrous material 102 may be a nonwoven material, fabric, or web. As used herein the term "nonwoven material or fabric or web" means a web having a structure of individual fibers or threads which are interlaid, but not in an identifiable manner as in a knitted fabric. Such nonwoven fabrics or webs have been formed from many processes such as, for example, meltblowing processes, spunbonding processes, bonded carded web processes, and needle punch (NP) felt processes.

According to an aspect, the tourmaline powder 104 is positioned on a surface of the fibrous material 102. While white tourmaline powder 104 is shown on the surface of the fibrous material 102 of FIG. 1, it is contemplated that black tourmaline powder or tourmaline powder of different colors may be utilized, without departing from the scope of the invention. It is contemplated that the personal protective equipment 100 may be worn while treating patients in clinical settings of a medical office or a hospital setting or may be worn by patients and/or the patient's visitors. The personal protective equipment 100 may be used by persons seeking to prevent transmission of airborne viruses, such as influenza and COVID-19. It is contemplated that tourmaline treated personal protective equipment 100 will attract airborne microbes, including viruses and bacteria and prevent them from infecting the person wearing the PPE. It is also contemplated that when a person wearing the tourmaline treated personal protective equipment 100 is an infected person, the tourmaline treated personal protective equipment 100 may help to reduce or substantially eliminate the spread of airborne microbes from the infected person.

In some embodiments, the fibrous material 102 include a single layer of nonwoven material. In some embodiments, the fibrous material 102 includes a plurality of layers of nonwoven material (not shown). A coating including tourmaline powder 104 may be applied to the surface of the single layer or one layer of the plurality of layers of the nonwoven material. The tourmaline powder 104 may be provided in a carrier material, such as a polymer for application/coating purposes. The coating of tourmaline powder 104 may be applied to at least one surface of the nonwoven material using a "lick coating" or roll coating method.

According to an aspect, the tourmaline powder 104 may be dusted, painted, or sprayed onto the surface(s) of the nonwoven material. The tourmaline powder 104 may be sprayed on so that it is on the outer surfaces or absorbed by the nonwoven material. In an embodiment, the anti-microbial substance may be in a liquid form. For example, the tourmaline may be mixed into a liquid, and the nonwoven material is submersed in the tourmaline liquid so that the tourmaline liquid is integrated into the matrix of fibers of the nonwoven material. The tourmaline liquid may form a solution. It is contemplated that the tourmaline liquid may be a suspension.

According to an aspect, the tourmaline powder 104 is first applied to the individual fibers of the fibrous material 102, before the nonwoven material or fabric is formed. Such fabric or fibers may include cotton, polyester, and the like.

According to an aspect, the tourmaline powder 104 is combined with a silicone resin polymer, which becomes a viscous material and forms a strong bond with the grains of the tourmaline powder 104. The mixture of silicone resin polymer and tourmaline powder 104 may be applied to the fabric that will be used to make the wearable personal protective equipment 100 or may be applied on the already made personal protective equipment 100. It is contemplated that the tourmaline treated personal protective equipment 100 will provide an electron filled barrier (ex: negative ions) between the user and airborne organisms, such as microbes. As mentioned hereinabove, the microbes will be rendered inactive upon contact with the negative ion field, created by tourmaline treated personal protective equipment 100.

According to an aspect, the personal protective equipment 100 may include a phytochemical 106. The phytochemical 106 may be provided alone or in combination with the tourmaline powder 104. Embodiments of the disclosure may further be associated with a mixture of the tourmaline powder 104 and the phytochemical 106. It is contemplated that when used in the personal protective equipment 100, the mixture of the the tourmaline powder 104 and the phytochemical 106 may attract bacterial or viral particles and kill or stunt the growth of the bacterial or viral particles.

According to an aspect, the phytochemical 106 includes bioactive compounds found in plants. According to an aspect, such bioactive compounds includes essential oils in oregano and thyme. According to an aspect, the phytochemical 106 includes carvacrol 108, which acts directly on bacteria and viruses to stunt their growth and prevent their spread from one location to another location. According to an aspect, the carvacrol 108 helps to prevent the transmission of bacteria and viruses between surfaces, and therefore between different persons. A mixture of tourmaline powder 104 and carvacrol 108 may be suitable for use in medical applications and may also be suitable for incorporation into various personal protective equipment 100, such as medical gowns, masks and gloves.

In an embodiment, the mixture of tourmaline powder 104 and carvacrol 108 is incorporated within the non woven fabric or fibrous material 102 of the personal protective equipment 100. According to an aspect, the mixture of tourmaline powder 104 and carvacrol 108 is coated onto the individual fibers that are used to form the fibrous material 102.

The personal protective equipment 100 may be worn while treating patients in clinical settings of a medical office or a hospital setting. The personal protective equipment 100 may be used by persons seeking to prevent the transmission of airborne viruses, such as influenza and COVID-19. It is contemplated that the personal protective equipment 100 will attract airborne microbes, including viruses and bacteria, and stunt the growth of such viruses and bacteria in order to prevent them from infecting a non-infected person wearing the personal protective equipment 100. For an infected person wearing the personal protective equipment 100, airborne microbes may be drawn to the personal protective equipment 100, and away from the others, thereby helping to reduce the likelihood of further bacteria and viral spread.

According to an aspect, the mixture of tourmaline powder 104 and carvacrol 108 may be incorporated into a nanoparticulate matter to elongate and extenuate the anti-microbial or antiviral effect of the carvacrol 108. For example, the mixture of carvacrol 108 and tourmaline powder 104 may be loaded into halloysite nanotubes (HNTs) using any number of techniques, such as melt compounding.

Figure 2:
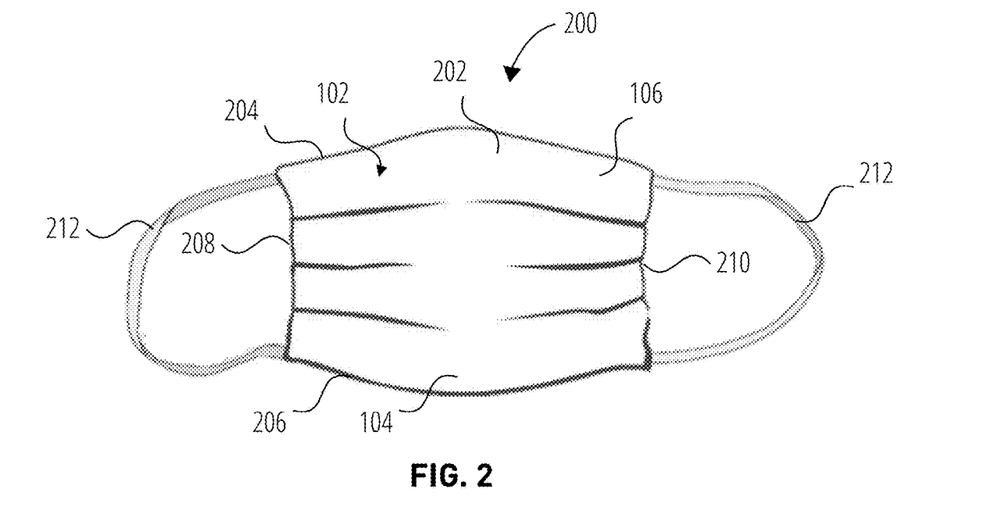
FIG. 2 illustrates a face mask including a fibrous material, in accordance with an embodiment.

As briefly described hereinabove, the tourmaline treated PPE may include a face mask 200 (FIG. 2). The face mask 200 includes a non woven body 202 having a top edge 204, a lower edge 206 spaced apart from the top edge 204, a left side edge 208 and a right side edge 210 spaced apart from the left side edge 208. Straps 212 may be provided on the left side edge 208 and the right side edge 210 in order to help secure the face mask 200 to a user's face. It is contemplated that the straps 212 may extend between the left side edge 208 and the right side edge 210. Alternatively, a first strap 212 may be connected, by both its ends, to the left side edge 208 and a second strap 212 may be connected, by both its ends, to the right side edge 210. Each strap 212 may only be connected to the non woven body 202 by one of its ends, so that the opposed and non-connected ends of multiple straps 212 can be tied together. The straps may be formed from plastic, rubber or fabric.

The non woven body 202 of the face mask 200 includes a fibrous material 102. According to an aspect, the tourmaline powder 104 is provided on or impregnated into the fibrous material 102. According to an aspect, carvacrol 108 may also be provided on or in the fibrous material 102. It is contemplated that face masks including a mixture of tourmaline powder 104 and carvacrol 108 may have the mixture painted or sprayed onto a surface of the face mask 200. The mixture may be impregnated into the non woven body 202.

Figure 3:
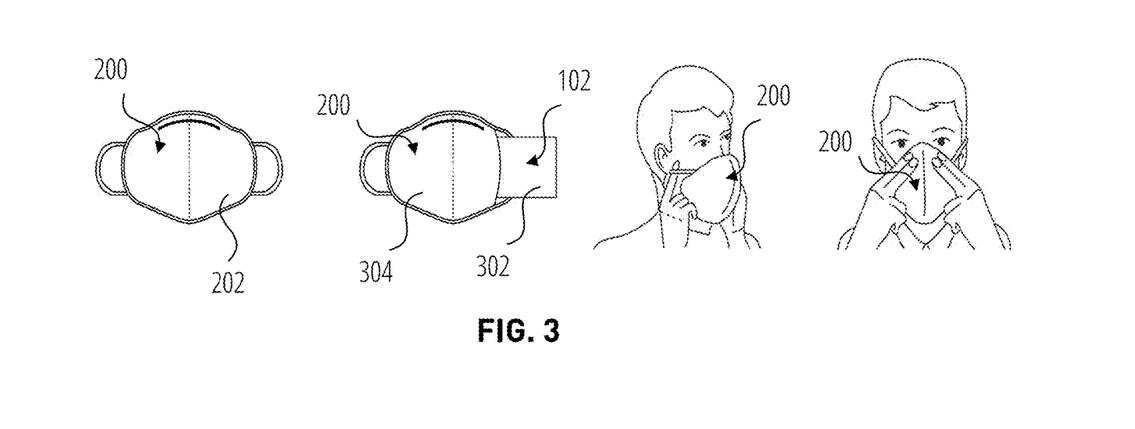
FIG. 3 illustrates views of a face mask with a removable fibrous material, in accordance with an embodiment.

As illustrated in FIG. 3, the face mask 200 may include a removable filter 302. According to an aspect, the removable filter 302 may include the fibrous material 102. The removable filter 302 may include at least one of the tourmaline powder 104 and carvacrol 108. While one removable filter 302 is shown, it is contemplated that more than one removable filter may be positioned in a pocket 304 formed in the non woven body 202 of the face mask 200.

While not shown, the face mask 200 may be formed from a plastic or rubber material that is injection molded or 3-D printed to have a desired shape, with a pocket 304 to receive the removable filter 302. Such face masks 200 may include a recess that is configured to fit around a user's oral and nasal areas. At least one surface of the face mask 200 may be moldable to the wearer's face, such as around the wearer's nose. The nosepiece of the face mask 200 may include a metal that can readily be bent to conform to contours of a person's face and promote a better fit. Because the face masks 200 may be provide in a variety of sizes, small, medium, large and extra large sizes, the nosepiece may be critical to ensuring that a seal is maintained to prevent leakage as the wearer breathes in and out.

Figure 4:
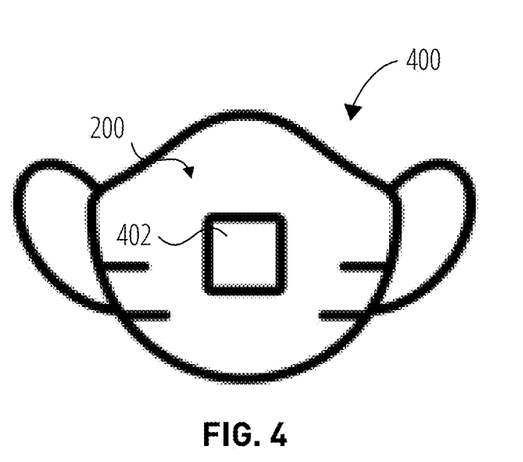
FIG. 4 illustrates a face mask including an inhalation valve including a filter element, in accordance with an embodiment.

FIG. 4 illustrates a face mask 200 including an inhalation valve 402. The term "inhalation valve" means a valve that opens to allow a fluid or gas to enter the interior gas space of a face mask 200. According to an aspect, the inhalation valve 402 further include materials for reducing contaminants from entering the inhalation and exhalation valves. According to an aspect, the inhalation and exhalation valves include a removable filter 302 including at least one of the tourmaline powder 104 and carvacrol 108.

Figure 5:
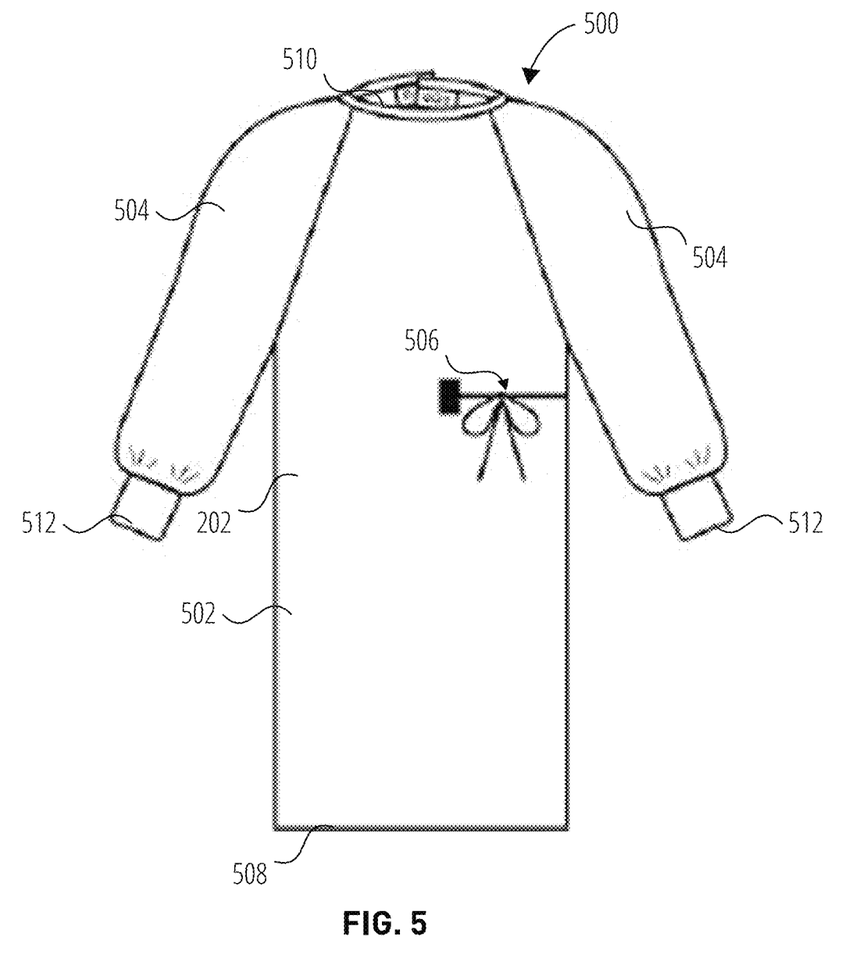
FIG. 5 illustrates a personal protective equipment in the form of a garment, in accordance with an embodiment.

Further embodiments of the disclosure may be associated with a personal protective equipment 100 configured as a garment 500. The garment 500 is illustrated in FIG. 5. The garment 500 includes a body covering portion 502. According to an aspect, the garment includes a neck line 510 and a lower hem 508 spaced apart from the neck line 510. The non woven body 202, including at least one of the tourmaline powder 104 and carvacrol 108, extends between the neck line 510 and the lower hem 508. The garment may be formed from a plurality of garment portions, with a connecting element 506 that secures each garment portion of the plurality of garment portions together.

Two spaced apart arm covering portions 504 may extend from the body covering portion 502. According to an aspect, a wrist band 512 may be provided at each of the arm covering portions 504. The wrist bands 512 may be sized that they fit snugly around the wearer's wrist. According to an aspect, at least one of the body covering portion 502, arm covering portion 504, connecting element 506, and wrist band 512 is formed from a non woven body 202.

Figure 6:
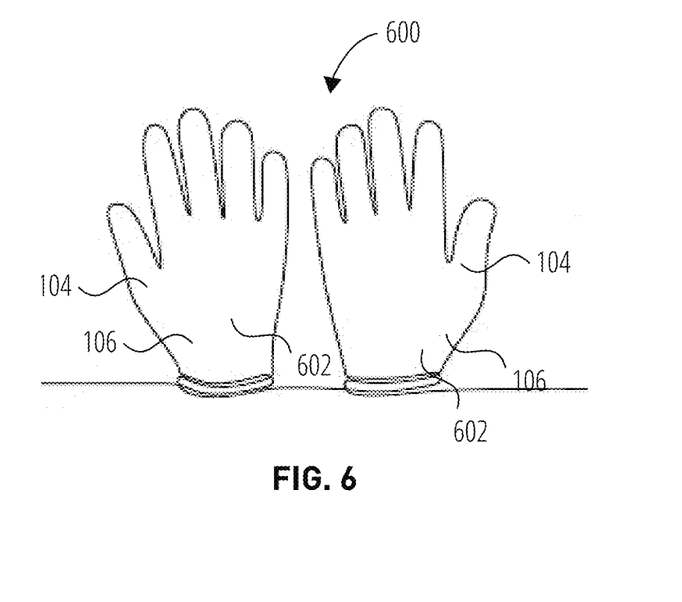
FIG. 6 illustrates a personal protective equipment in the form of a glove, in accordance with an embodiment.

FIG. 6 illustrates an embodiment where at least one of the tourmaline powder 104 and carvacrol 108 is provided on gloves 600. It is contemplated that when used in gloves 600, such as nitrile gloves, upon contact with organisms on the wearer's hands or on surfaces that come into contact with the gloves 600, the gloves 600 may inhibit the growth of or kill the microorganisms. During the fabrication of the gloves 600, the tourmaline powder can be incorporated with the nitrile when the nitrile is in a fluid form, so that the tourmaline powder is incorporated within the structure of the gloves once the material cures. Similarly, the carvacrol 108 may be incorporated with the nitrile when the nitrile is in a fluid form, so that the carvacrol 108 is incorporated within the structure of the gloves 600 once the material cures. It is further contemplated the mixture of tourmaline powder 104 and carvacrol 108 may be used with gloves, such as a coating on the gloves, or incorporated into the structure of the gloves 600 during the manufacturing process.

Figure 7:
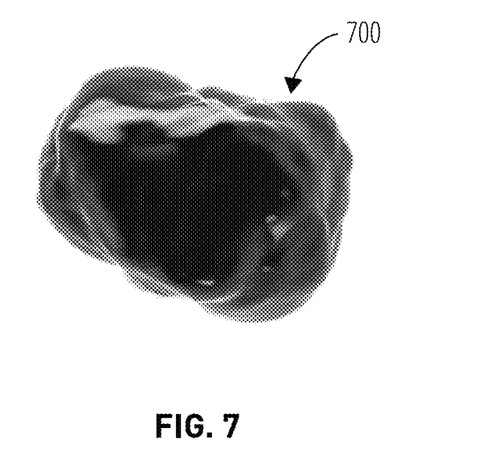
FIG. 7 illustrates medicament in the form of a gel, in accordance with an embodiment.

Embodiments of the disclosure are further associated with a medicant 700. An example of the medicant 700 is illustrated in FIG. 7. The tourmaline powder 104 may be mixed with a biocompatible resin polymer, and the mixture may then be used as a topical agent for various wound dressings. The tourmaline mixture may be applied to pressure sores, such as decubitus ulcers. According to an aspect, the tourmaline powder may be added to gels or ointment-based medicaments that are meant for external use on sores or irritations of bacterial, fungal or viral origin. It is contemplated that a gel-based or ointment-based medicant 700 that includes tourmaline may be a useful application for heretic lesions (herpes simplex one and two), fungal or bacterial skin eczema, etc.

A mixture of tourmaline powder 104 and carvacrol 108 may be used as a topical agent for use on surface wounds. The topical agent may include the mixture, as well as a biocompatible resin polymer. The mixture may then be used for various wound dressings. According to an aspect, the mixture may be applied to pressure sores, such as decubitus ulcers. The mixture may be in in the form of a gel or ointment, or may be added to gels or ointment-based medicaments. Such gels or ointments may be applied to heretic lesions, fungal or bacterial skin eczema, and the like. The mixture may be incorporated into a paste, as described hereinabove with respect to the use of tourmaline for application to lesions.

Figure 8:
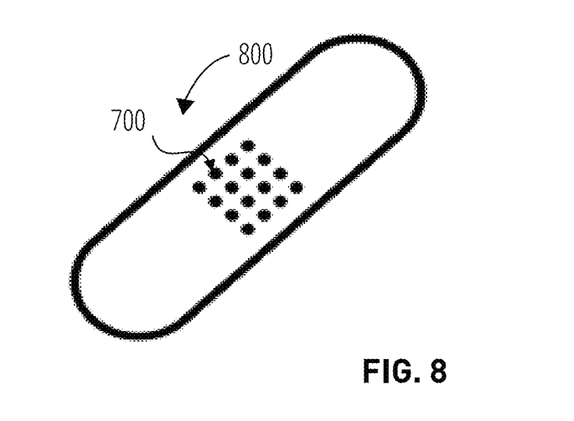
FIG. 8 illustrates a bandage including the medicament, in accordance with an embodiment.

Further embodiments include a bandage 800. The bandage 800 may include the tourmaline powder 104 or a combination of the tourmaline powder 104 and carvacrol 108 (that is, a medicant 700), and may be secured or adhered to a user's skin. Alternatively, the tourmaline mixture may be added to the surface of bandages prior to the bandage being secured or adhered to the user's skin.

Further embodiments of the disclosure are associated with use of the tourmaline powder 104, alone or in combination with the carvacrol 108, for oral applications.

According to an aspect, the tourmaline powder 104 is used in addition to or incorporated into existing and medically (FDA) approved topical agents for direct application to lesions, such as in the case of canker sores. An example of such a paste is triamcinolone acetonide dental paste, which is typically used to treat painful lesions of the mouth.

The tourmaline powder 104 may also be incorporated into a paste to be applied onto oral lesions. Such pastes may include one or more of gelatin, pectin, carboxymethylcellulose sodium, and mineral oil gel base mixture.

Figure 9:
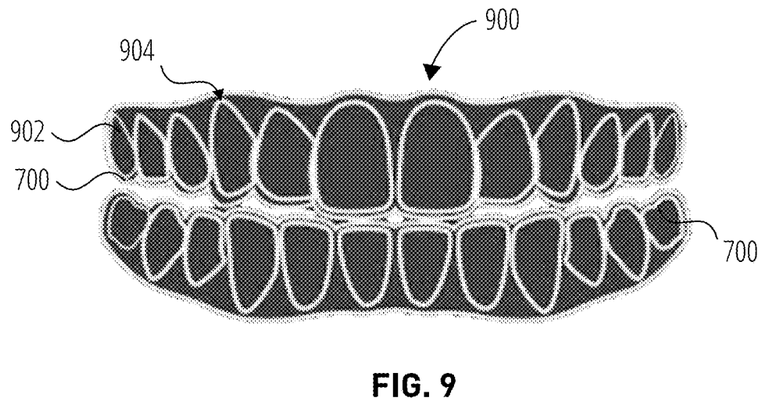
FIG. 9 illustrates an oral appliance, in accordance with an embodiment.

According to an aspect, and as illustrated in FIG. 9, embodiments of the disclosure may be associated with an oral appliance. The oral appliance 900 includes a mouthpiece/tray. Such trays 902 are illustrated in, for example, US Publication No. 2020/0170574, and are incorporated herein by reference, to the extent consistent with this disclosure. The tray 902 is configured to be worn on an upper dentition or a lower dentition of a user and includes at least one of a tourmaline powder 104 and a phytochemical 106.

The tray 902 may be molded to fit the user's upper dentition or lower dentition. A physical or a digital model of the user's upper and/or lower dentition may be made, then a molding material may be used to form the tray 902 based on the dimensions of the physical or digital model. According to an aspect, the tray includes a plurality of cavities 904 that fit over or encapsulate the user's dentition in order to ensure a secure and comfortable fit. The tray 902 may be composed of at least one of a polymer, a thermoplastic, an acrylic, a silicone, and a rubber material. According to an aspect, a composition of the tourmaline powder 104 and phytochemical 106 may be molded with other materials during the manufacture of the tray 902. Alternatively, the tourmaline powder 104 and the phytochemical 106 are provided as a composition. The composition may be a paste or a gel (such as medicant 700), that may be applied to an inner surface or an outer surface of the tray 902.

As described hereinabove, the phytochemical 106 may include carvacrol 108. It is contemplated that the presence of carvacrol 108, molded within the matrix of the tray 902 or coated on surfaces of the tray 902, stunts any growth of viruses and bacteria, such as the virus that causes COVID-19.

According to an aspect, the tray 902 is an aligner tray. The tray 902 may include a plurality of preformed aligner trays. The preformed aligner trays are configured to be sequentially worn by the user to reposition the user's upper dentition or lower dentition.

Further embodiments of the disclosure are associated with an oral appliance kit. The oral appliance kit includes an oral appliance including a plurality of trays 902 configured to be worn on an upper dentition or a lower dentition of a user. The oral appliance kit further includes a composition configured to be applied on an inner surface or an outer surface of the plurality of trays. The composition includes a tourmaline powder 104 and a phytochemical 106.

It is further contemplated that tourmaline powder 104 may be included in various breathing tubes or endotracheal tubes. It is contemplated that the tourmaline powder 104 may be combined with a moldable material that is used to form the breathing or endotracheal tube. According to an aspect, the tourmaline powder 104 is mixed into the moldable material, and the mixture is them added to a mold member to form the breathing or endotracheal tube.

It is further contemplated that tourmaline powder 104 may be included in various respiratory support systems. For example, the tourmaline powder 104 may be used in the manufacture of various gas delivery tubes, tracheostomy tubes, air filters used for respiratory support systems, and the like. While not specifically referenced herein, various other respiratory systems are contemplated.

A mixture of the tourmaline powder 104 and carvacrol 108 may be included in respiratory support systems, such as gas delivery tubes, tracheostomy tubes, air filters used for respiratory support systems, and the like. According to an aspect, the mixture of tourmaline powder 104 and carvacrol 108 is included in breathing tubes or endotracheal tubes. While not specifically referenced herein, various other respiratory systems are contemplated.

Figure 10:
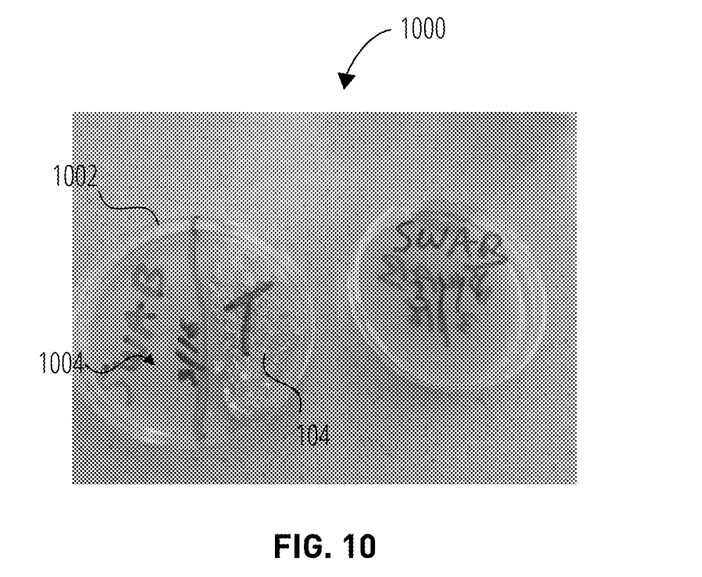
FIG. 10 is a photograph of a petri dish including a bacteria side and a tourmaline side, according to an embodiment.
Figure 11:
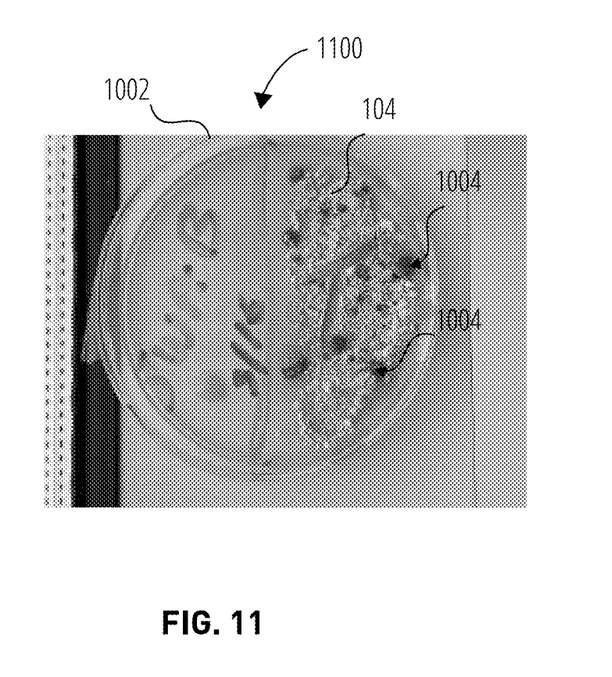
FIG. 11 is a photograph of the petri dish of FIG. 10, illustrating the formation of bacterial colonies on the tourmaline side.
Figure 12:
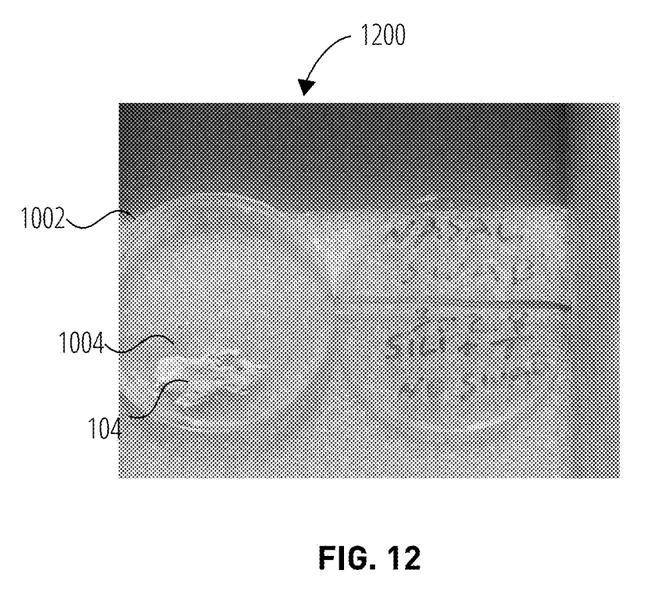
FIG. 12 is a photograph of a petri dish including a bacteria side and a tourmaline and silicone side, according to an embodiment.

FIG. 10, FIG. 11 and FIG. 12 demonstrate various experiments performed using tourmaline. In FIG. 10, a test 1000 was conducted with a first sample of a live organism smear (i.e., human nasal secretions) or microbes 1004. The microbes 1004 were placed on a petri dish 1002 and assessed after a one-week incubation period FIG. 11. In test 1000, one-half of the petri dish was swabbed with a live organism smear (i.e., human nasal secretions) or microbes 1004 while the other half of the petri dish was not swabbed and only contained clean tourmaline powder 104. FIG. 10 illustrates the petri dish 1002 on the day of application of the microbes 1004 and the clean tourmaline powder 104.

FIG. 11 illustrates the petri dish 1002 of FIG. 10 after the one-week incubation period (indicated as test 1100). As shown, microbes 1004 were identifiable on the tourmaline powder 104 treated half of the petri dish. It is believed that the negative ions of tourmaline and the positive ions of the nasal secretions interact with each other in order to trap and inactivate the microbes 1004 of the nasal secretions. As shown in Sample A of FIG. 11, the microbes 1004 of the nasal secretions are present on the tourmaline powder 104 side of the petri dish 1002, as opposed to the nasal secretion side. These microbes 1004 were pulled towards the tourmaline powder 104 and inactivated upon contact with the negative ions.

FIG. 12 illustrates the results of a test 1200 of a second sample. In test 1200, a petri dish 1002 was provided. The petri dish 1002 included one half swabbed with a live organism smear (i.e., human nasal secretions) or microbes 1004 and the other half included a combination of silicone and tourmaline. After a 3-day incubation period, microbes 1004 were identifiable on the tourmaline treated half of the petri dish. Similar to test 1100, it is contemplated that for test 1200 the negative ions of the tourmaline powder and the positive ions of the nasal secretions interact with each other in order to trap and inactivate the microbes 1004 of the nasal secretions.

Figure 15:
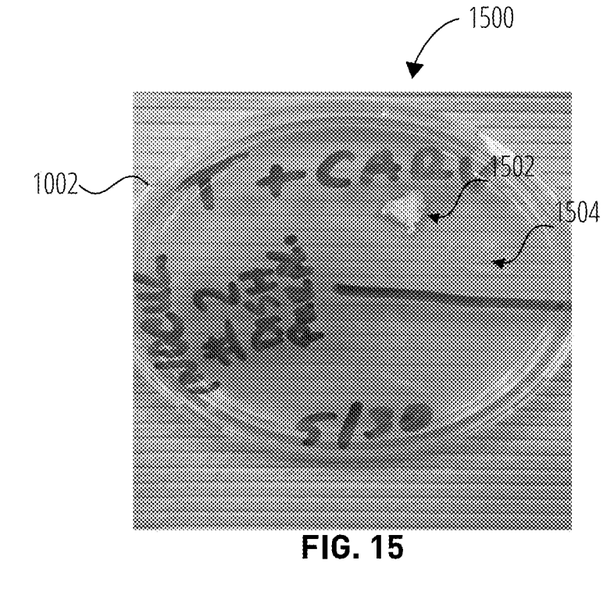
FIG. 15 is a photograph of a petri dish including a sample of a mixture of tourmaline and carvacrol and a sample of the active colony of FIG. 14, according to an aspect.

A paste of a tourmaline-carvacrol mix 1502 was created. The paste was made by combining 1.25 mL of tourmaline with 0.5 mL of carvacrol, and mixing the tourmaline powder 104 and carvacrol 108 together until a paste-like consistency was achieved. The paste was added to a number of petri dishes.

Figure 13:
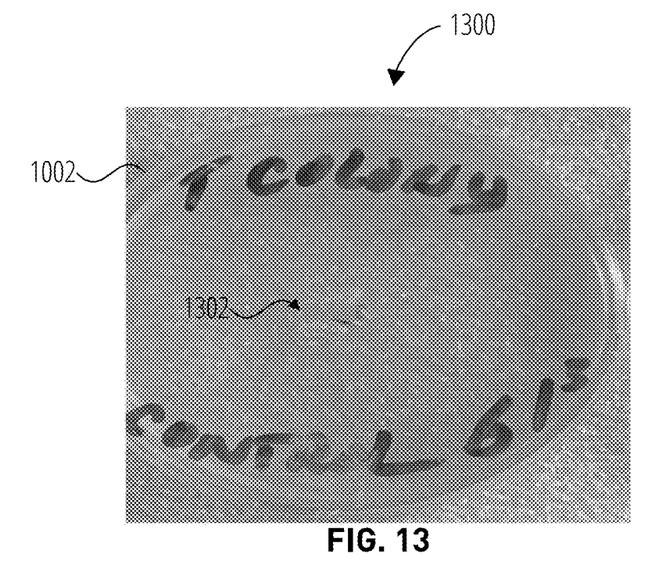
FIG. 13 is a photograph of a petri dish upon initial inoculation, according to an embodiment.

Test 1300 is illustrated in FIG. 13. Test 1300 included a sample of an active colony of microbes 1004 (by inoculating the petri dish 1002 with nasal secretions) on a petri dish 1002, inoculation at T=0 1302. Test 1300 served as a control and illustrates the active colony or microbes 1004 on the first day (T=0). The petri dish included a silicone material. No other material was added to the petri dish 1002. The petri dish 1002 was covered and left at room temperature for four (4) days in a dark environment.

Figure 14:
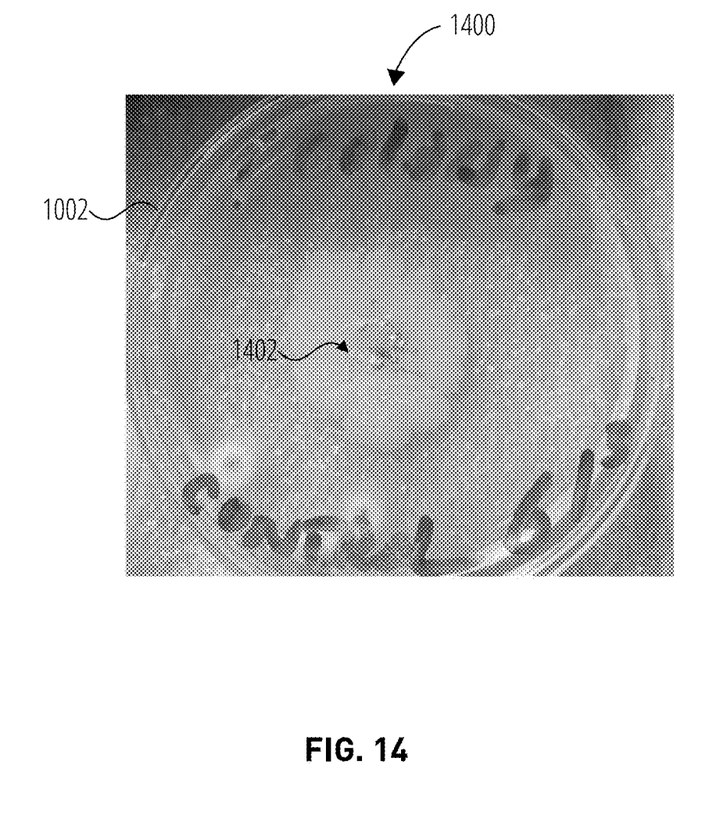
FIG. 14 is a photograph of the petri dish of FIG. 13, illustrating growth of an active colony after the initial inoculation, according to an aspect.

FIG. 14 illustrates an active colony at T=4 1402. As show, that the microbes 1004 formed a colony and demonstrated substantial growth after the four day (T=4) period.

FIG. 15 illustrates a test 1500 that included a petri dish 1002 with an active colony at T=0 1504 on a first side and a tourmaline-carvacrol mix 1502 on the second side. No growth of the active colony at T=0 1504 was seen on the first day (T=0).

Figure 16:
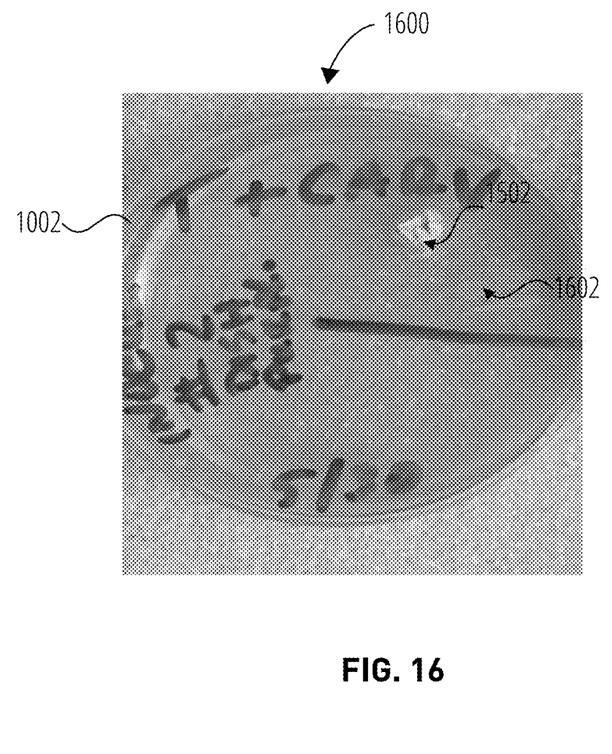
FIG. 16 is a photograph of the petri dish of FIG. 15, illustrating stunted growth of the active colony of FIG. 14, according to an aspect.

FIG. 16 illustrates a test 1600 of the petri dish 1002 of FIG. 15, after a time period of eight (8) days passed (T=8). As illustrated in FIG. 16, the active colony at T=8 1602 did not grow. While the negative ions in the tourmaline powder 104 are attracted to viruses and bacteria, carvacrol 108 stunts any growth of viruses and bacteria.

Figure 17:
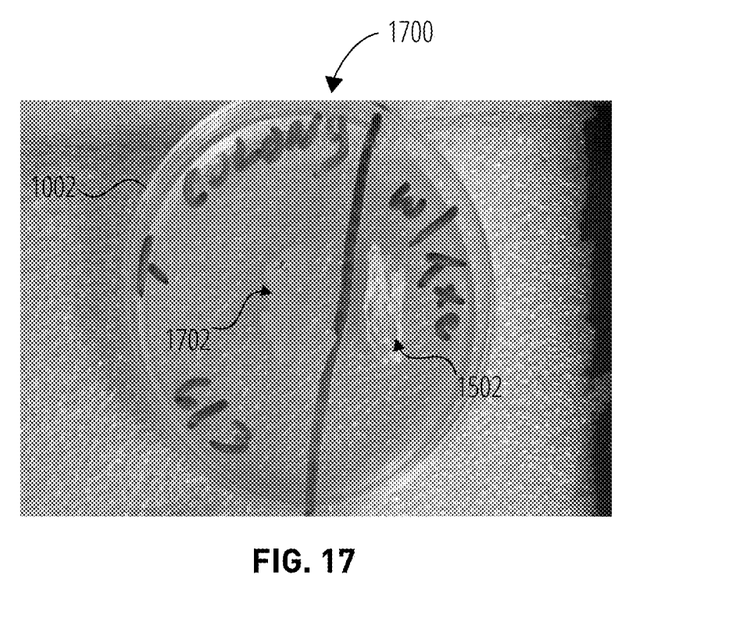
FIG. 17 is a photograph of a petri dish including a sample of a mixture of tourmaline and carvacrol and a sample of the active colony of FIG. 14, according to an aspect.

FIG. 17 illustrates a test 1700 of the first day (T=0) an active colony is provided on a petri dish 1002, with no growth is seen. The active colony at T=0 1702 was provided on a first side of the petri dish 1002 and the tourmaline-carvacrol mix 1502 was provided on a second side.

Figure 18:
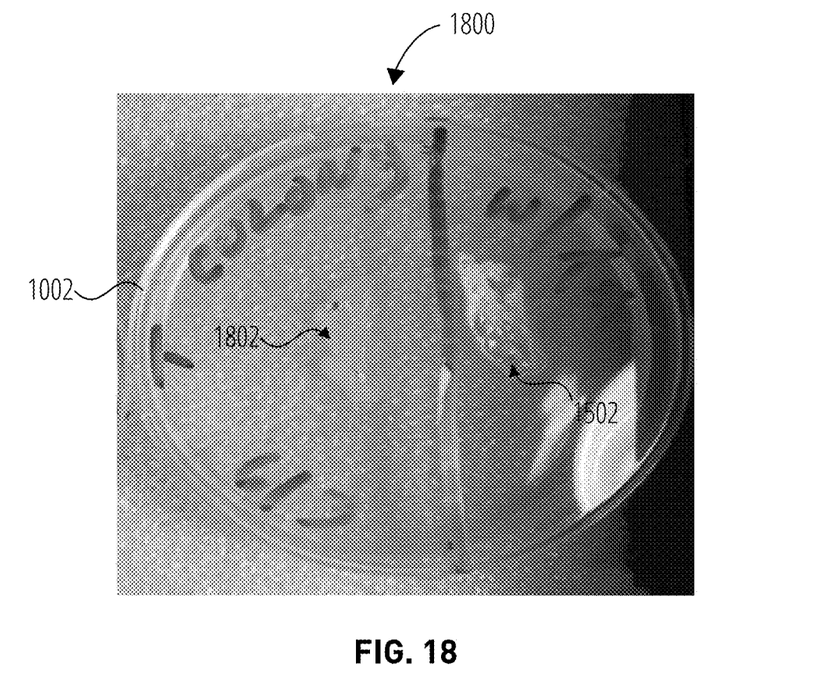
FIG. 18 is a photograph of the petri dish of FIG. 17, illustrating stunted growth of the active colony of FIG. 14.

FIG. 18 illustrates a test 1800 after a time period of eight (8) days passed (T=8). As illustrated in FIG. 18, the active colony at T=8 1802 did not grow and remained similar in size and quantity as active colony at T=0 1702. While the negative ions in tourmaline powder 104 are attracted to viruses and bacteria, carvacrol 108 stunts any growth of such viruses and bacteria.

This disclosure, in various embodiments, configurations and aspects, includes components, methods, processes, systems, and/or apparatuses as depicted and described herein, including various embodiments, sub-combinations, and subsets thereof. This disclosure contemplates, in various embodiments, configurations and aspects, the actual or optional use or inclusion of, e.g., components or processes as may be well-known or understood in the art and consistent with this disclosure though not depicted and/or described herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower" etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that the appended claims should cover variations in the ranges except where this disclosure makes clear the use of a particular range in certain embodiments.

The terms "determine", "calculate" and "compute," and variations thereof, as used herein, are used interchangeably and include any type of methodology, process, mathematical operation or technique.

This disclosure is presented for purposes of illustration and description. This disclosure is not limited to the form or forms disclosed herein. In the Detailed Description of this disclosure, for example, various features of some exemplary embodiments are grouped together to representatively describe those and other contemplated embodiments, configurations, and aspects, to the extent that including in this disclosure a description of every potential embodiment, variant, and combination of features is not feasible. Thus, the features of the disclosed embodiments, configurations, and aspects may be combined in alternate embodiments, configurations, and aspects not expressly discussed above. For example, the features recited in the following claims lie in less than all features of a single disclosed embodiment, configuration, or aspect. Thus, the following claims are hereby incorporated into this Detailed Description, with each claim standing on its own as a separate embodiment of this disclosure.

Advances in science and technology may provide variations that are not necessarily express in the terminology of this disclosure although the claims would not necessarily exclude these variations.

What is claimed is:

1. A personal protective equipment comprising:
   a wearable substrate; and
   an anti-microbial substance positioned on or in the substrate, the anti-microbial substance comprising tourmaline and carvacrol.

2. The personal protective equipment of claim 1, wherein the anti-microbial substance is a mixture of the tourmaline and the carvacrol.

3. The personal protective equipment of claim 2, wherein the mixture is coated or sprayed onto the substrate.

4. A personal protective equipment comprising:
a nonwoven body; and
an anti-microbial substance positioned on or in the nonwoven body, the anti-microbial substance comprising tourmaline and carvacrol,
wherein the anti-microbial substance is adhered to the nonwoven body.

5. The personal protective equipment of claim 4, wherein the nonwoven body further comprises:
a top edge;
a lower edge; and
opposed sided edges.

6. The personal protective equipment of claim 4, wherein the nonwoven body comprises a fibrous material.

7. The personal protective equipment of claim 6, wherein the fibrous material is impregnated with the anti-microbial substance.

8. The personal protective equipment of claim 4, wherein the nonwoven body includes a plurality of nonwoven layers, and
the anti-microbial substance is adhered to at least one nonwoven layer of the plurality of nonwoven layers.

9. A personal protective equipment comprising:
a nonwoven body comprising:
a neck line; and
a lower hem spaced apart from the neck line;
a polymer positioned on or in the nonwoven body; and
an anti-microbial substance integrated with the polymer, the anti-microbial substance comprising tourmaline,
wherein the polymer is adhered to the nonwoven body, and the anti-microbial substance extends between the neckline and the lower hem, and wherein the anti-microbial substance further comprises a phytochemical or biocompatible resin polymer.

10. The personal protective equipment of claim 9, wherein the nonwoven body comprises a fibrous material.

11. The personal protective equipment of claim 10, wherein the anti-microbial substance is embedded within the fibrous material.

12. The personal protective equipment of claim 9, wherein the nonwoven body comprises:
an interior face; and
an exterior face,
wherein the anti-microbial substance is adhered to at least one of the interior face or the exterior face.

13. The personal protective equipment of claim 9, wherein the phytochemical comprises carvacrol.

14. The personal protective equipment of claim 9, wherein the biocompatible resin polymer is a silicone resin polymer.

* * * * *